United States Patent
Appenzeller et al.

(10) Patent No.: US 7,571,321 B2
(45) Date of Patent: Aug. 4, 2009

(54) IDENTITY-BASED-ENCRYPTION MESSAGING SYSTEM

(75) Inventors: Guido Appenzeller, Menlo Park, CA (US); Matthew J Pauker, Menlo Park, CA (US); Terence Spies, Palo Alto, CA (US); Rishi R Kacker, Menlo Park, CA (US)

(73) Assignee: Voltage Security, Inc., Palo Alto, CA (US)

( * ) Notice: Subject to any disclaimer, the term of this patent is extended or adjusted under 35 U.S.C. 154(b) by 601 days.

(21) Appl. No.: 10/390,058

(22) Filed: Mar. 14, 2003

(65) Prior Publication Data

US 2004/0179684 A1 Sep. 16, 2004

(51) Int. Cl.
*H04L 9/00* (2006.01)
*H04L 9/32* (2006.01)

(52) U.S. Cl. .......................................... 713/171; 726/3
(58) Field of Classification Search ........................ None
See application file for complete search history.

(56) References Cited

U.S. PATENT DOCUMENTS

| 5,016,276 | A | 5/1991 | Matumoto et al. |
|---|---|---|---|
| 5,159,632 | A | 10/1992 | Crandall |
| 5,271,061 | A | 12/1993 | Crandall |
| 5,272,755 | A | 12/1993 | Miyaji et al. |
| 5,581,616 | A | 12/1996 | Crandall |
| 5,715,403 | A | 2/1998 | Stefik et al. |
| 6,061,448 | A | 5/2000 | Smith et al. |
| 6,236,971 | B1 | 5/2001 | Stefik et al. |
| 6,385,596 | B1 | 5/2002 | Wiser et al. |
| 6,658,415 | B1 | 12/2003 | Brown et al. |
| 2002/0076042 | A1 | 6/2002 | Sandhu et al. |

(Continued)

FOREIGN PATENT DOCUMENTS

JP 2000349749 12/2000

OTHER PUBLICATIONS

Boneh et al., Identity Based Encryption from the Weil Pairing, Advances in Cryptology—Crypto 2001, LNCS 2139, Springer, pp. 213-229.*
Boneh et al., Identity-Based Encryption, <http://crypto.stanford.edu/ibe>, Apr. 8, 2002.*
Schneier, Applied Cryptography: Protocols, Algorithms, and Source Code in C, Second Edition, John Wiley and Sons, 1996, pp. 31-34.*

(Continued)

*Primary Examiner*—Nasser Moazzami
*Assistant Examiner*—Brandon S Hoffman
(74) *Attorney, Agent, or Firm*—Treyz Law Group; G. Victor Treyz; David C. Kellogg

(57) ABSTRACT

A system is provided that uses identity-based encryption to support secure communications between senders and recipients over a communications network. Private key generators are used to provide public parameter information. Senders encrypt messages for recipients using public keys based on recipient identities and using the public parameter information as inputs to an identity-based encryption algorithm. Recipients use private keys to decrypt the messages. There may be multiple private key generators in the system and a given recipient may have multiple private keys. Senders can include private key identifying information in the messages they send to recipients. The private key identifying information may be used by the recipients to determine which of their private keys to use in decrypting a message. Recipients may obtain the correct private key to use to decrypt a message from a local database of private keys or from an appropriate private key server.

16 Claims, 7 Drawing Sheets

U.S. PATENT DOCUMENTS

2003/0081785 A1     5/2003     Bonch et al.
2003/0182573 A1     9/2003     Toneguzzo et al.

OTHER PUBLICATIONS

Atkins et al., "PGP Message Exchange Formats," Informational Request for Comments (Aug. 1996).

Boneh et al., "Identity-Based Encryption from the Weil Pairing," from *Crypto '2001* (Oct. 2002).

Cocks, Clifford, "An Identity Based Encryption Scheme based on Quadratic Residues." (2001).

Horwitz et al., "Toward Hierarchical Identity-Based Encryption," *Proceedings of EUROCRYPT 2002*, (Apr. 28, 2002-May. 2, 2002) Lecture-Notes in Computer Science, Stanford University.

Housley et al., "Internet X.509 Public Key Infrastructure Certificate and CRL Profile," Standards Track Request for Comments (Jan. 1999).

Lai et al., "A Proposal for a New Block Encryption Standard," *Advances in Cryptology: EUROCRYPT 1990 Proceedings*, Springer Verlag: pp. 389-404 (1991).

Mont et al., "The HP Time Vault Service: Innovating the way confidential information is disclosed, at the right time" http://www.hpl.hp.com/techreports/2002/HPL-2002-243.html (2002).

Rivest et al., "A Method for Obtaining Digital Signatures and Public-Key Cryptosystems," from *The Communications of the ACM* (Feb. 1978).

Chandramouli, Ramaswamy, "Application of XML Tools for Enterprise-Wide RBAC Implementation Tasks", National Institute on Standards and Technology, pp. 11-18, ISBN: 1-58113-259-x/00/07.

Schneier. B. Applied Cryptography: Protocols, Algorithms, and Source Code in C. Second Edition, John Wiley & Sons, 1996, pp. 31-34, especially p. 32-33.

Boneh. D. et al. Identity-Based Encryption. http://crypto.stanford,edu/ibe. Apr. 8, 2002, whole document.

Jeong et al., "Mutual authentication protocols for the virtual home environment in 3G mobile network", Globecom' 02. 2002-IEEE Global Telecommunications Conference. Conference Proceedings. Taipei, Taiwan, Nov. 17-21, 2002, IEEE Global Telecommunications Conference, New York, NY: IEEE, US, vol. 1 of 3, Nov. 17, 2002, pp. 1658-1662, XP010636425, ISBN: 0-7803-7632-3.

Menezes et al., "Handbook of Applied Cryptography", CRC Press Series on Discrete Mathematics and its Applications, 1997, pp. 561-566, XP002389193, Boca Raton, FL, US, ISBN: 0-8493-8523-7.

Shamir et al., "Identity-Based Cryptosystems and Signature Schemes" Lecture Notes in Computer Science, Springer Verlag, New York, NY, US, 1985, pp. 47-53, XP000675444, ISSN: 0302-0743.

Zimmermann et al., "PGP Message Exchange Formats", RFC 1991, Aug. 1996, XP002206142.

* cited by examiner

IDENTITY-BASED-ENCRYPTION MESSAGING SYSTEM

BACKGROUND OF THE INVENTION

This invention relates to encryption, and more particularly, to identity-based-encryption schemes for sending secure messages.

Cryptographic systems are used to provide secure communications services such as secure email services and secure web browsing.

With symmetric key cryptographic systems, the sender of a message uses the same key to encrypt the message that the receiver of the message uses to decrypt the message. Symmetric-key systems require that each sender and receiver exchange a shared key in a secure manner.

With public-key cryptographic systems, two types of keys are used—public keys and private keys. Senders may encrypt messages using the public keys of the receivers. Each receiver has a private key that is used to decrypt the messages for that receiver.

One public-key cryptographic system that is in use is the RSA cryptographic system. Each user in this system has a unique public key and a unique private key. A sender using the system may obtain the public key of a given receiver from a key server connected to the Internet. To ensure the authenticity of the public key and thereby defeat possible man-in-the-middle attacks, the public key may be provided to the sender with a certificate signed by a trusted certificate authority. The certificate may be used to verify that the public key belongs to the intended recipient of the sender's message.

To allow an organization to revoke the secure email privileges of an employee when the employee no longer works for the organization, some organizations may arrange to have the public keys of all of their employees automatically expire at the end of each day. New public keys for the current employees may be generated each day. The new public keys may be made publicly available by placing them on a public key server.

Because encryption using public-key encryption algorithms is computationally intensive, some systems allow users to use public-key encryption to securely exchange a shared symmetric key. The symmetric key may then be used to support a secure communication session.

With public-key encryption systems, a sender must obtain the public key of a message recipient before the sender can encrypt a message. A sender may be traveling with a portable computer and may desire to respond to an email message that has been temporarily stored on the computer. If the sender does not already have a copy of the public key of the person who sent the message, the sender must obtain that public key from a public key server. However, the sender's portable computer may not be on-line when the sender desires to compose the response to the email. The sender will therefore not be able to access an on-line public key server and may be unable to encrypt the message as soon as it is composed. Because the sender's computer may be at risk of being stolen, the unencrypted message on the computer may be susceptible to interception.

Identity-based encryption schemes work differently than public-key systems. With an identity-based encryption system, senders and receivers communicate securely using public parameter information and private keys. Each user has a unique private key based on the user's identity for decrypting messages, but the public parameter information that is used during the encryption and decryption processes may be shared by many users. These schemes are said to be "identity based," because user-specific identity information such as a particular user's email address is used as one of the inputs to the identity-based encryption algorithm.

With one suitable arrangement, a user's email address or a user's email address concatenated with a date stamp may be used to identify each user. With this approach, senders who are currently off-line and who would therefore be unable to access a public key server in a conventional public-key system, may still immediately encrypt sensitive messages if they have access to the public parameter information of the user. Because all of the users in an organization may share the same public parameter information, senders may often have access to the correct public parameter information to use for a given recipient, even if the sender has never communicated with that receiver before. When network access is available, the encrypted message may be transmitted to the receiver. Receivers can decrypt messages using their private keys.

In an identity-based cryptographic system, private keys may be generated by a private key generator. The private key generator uses secret information (i.e., a so-called "master secret") as an input when generating the private keys. The security of the system rests on the ability of the organization holding the master secret to maintain its secrecy.

Because of the importance of maintaining the secrecy of the master secret in identity-based cryptographic systems, certain organizations may be unwilling to entrust custodial responsibility for the master secret to third parties. As a result, there may be multiple private key generators in a system, each with its own master secret.

In an identity-based encryption environment in which there are multiple private key generators or other opportunities for a user to have multiple private keys, users may have difficulties in locating the correct private key to use to decrypt a given message.

SUMMARY OF THE INVENTION

In accordance with the present invention, a system is provided that allows messages to be exchanged securely over a communications network. Identity-based encryption techniques may be used to encrypt the messages. The system may have multiple identity-based-encryption private key generators. Each private key generator may have its own master secret and may generate its own associated public parameter information. Private key generators may, from time to time, generate different versions of public parameter information and corresponding different versions of the matching private keys.

Users in the system may have relationships with more than one private key generator. For example, a user may have a relationship with one private key generator at the user's bank and may have a relationship with another private key generator at the user's employer. With this type of arrangement, the private key that the user receives from the bank's private key generator will be generated with a different master secret than the private key that the user receives from the employer's private key generator, so the user will have a number of different private keys.

When there are multiple private keys associated with an individual user, a message recipient may process information provided with incoming messages to determine which private key to use to decrypt a given message. If desired, senders may provide recipients with private key identification information that the recipients may use to determine which private keys to use.

As an example, a sender of an encrypted message may provide information with a message that specifies which private key generator was used to generate the public parameter information that the sender used as an input in encrypting the message. The information may be, for example, information that identifies a private key generator by server name, IP address, etc. Because the identified private key generator was, in this example, used to create the public parameter information that the sender used to encrypt the message, the identified private key generator is the appropriate private key generator to generate the corresponding private key for the recipient to use in decrypting the message. The recipient may therefore use the information that identifies the private key generator to obtain the appropriate private key.

As another example, in an environment in which public parameter information is generated in "versions," private key identifying information may be provided with messages to help recipients identify the appropriate private key that should be used (i.e., the private key corresponding to the public parameter information version that was used during encryption).

Private keys may be obtained from the private key generators over a communications network. Private keys may also be stored locally (e.g., in a private key database on the recipient's equipment). The private key identifying information that is received from the sender may be used to assist the recipient in obtaining the appropriate private key to use to decrypt the message. For example, the private key identifying information may be used to help the recipient identify the correct private key generator to contact or the correct version of public parameter information that was used in encrypting a message. Using the private key identifying information, the appropriate private key may be obtained locally (if previously stored) or may be obtained from the private key generator over the communications network (and may then be stored locally for the next decryption).

If desired, the private key identifying information may be provided in the recipient field of an email message. For example, the name of the server used to implement a given private key generator or public parameter version number information may be provided as part of a key info field in an email message recipient field. Other information may also be provided in the recipient info field such as the public parameter information itself.

The information in the key info field may be transformed using a hash function. This arrangement may help conceal potentially sensitive information in the key info field such as key server identity information, special "encryption" identity information that a user may be using only for secure email purposes (which may be different than a user's usual email address), etc. The hash function approach also tends to make the key info field shorter, because the output of hash functions is typically shorter than the input.

The identity-based-encryption cryptographic techniques that are used to encrypt the messages may use identity-based-encryption public keys based on recipient identifier information such as a recipient's email address, the recipient's email address concatenated with a validity period, or other suitable recipient identifier. The public keys used during encryption may also be based on other information such as public parameter version number, private key generator identifying information, etc.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
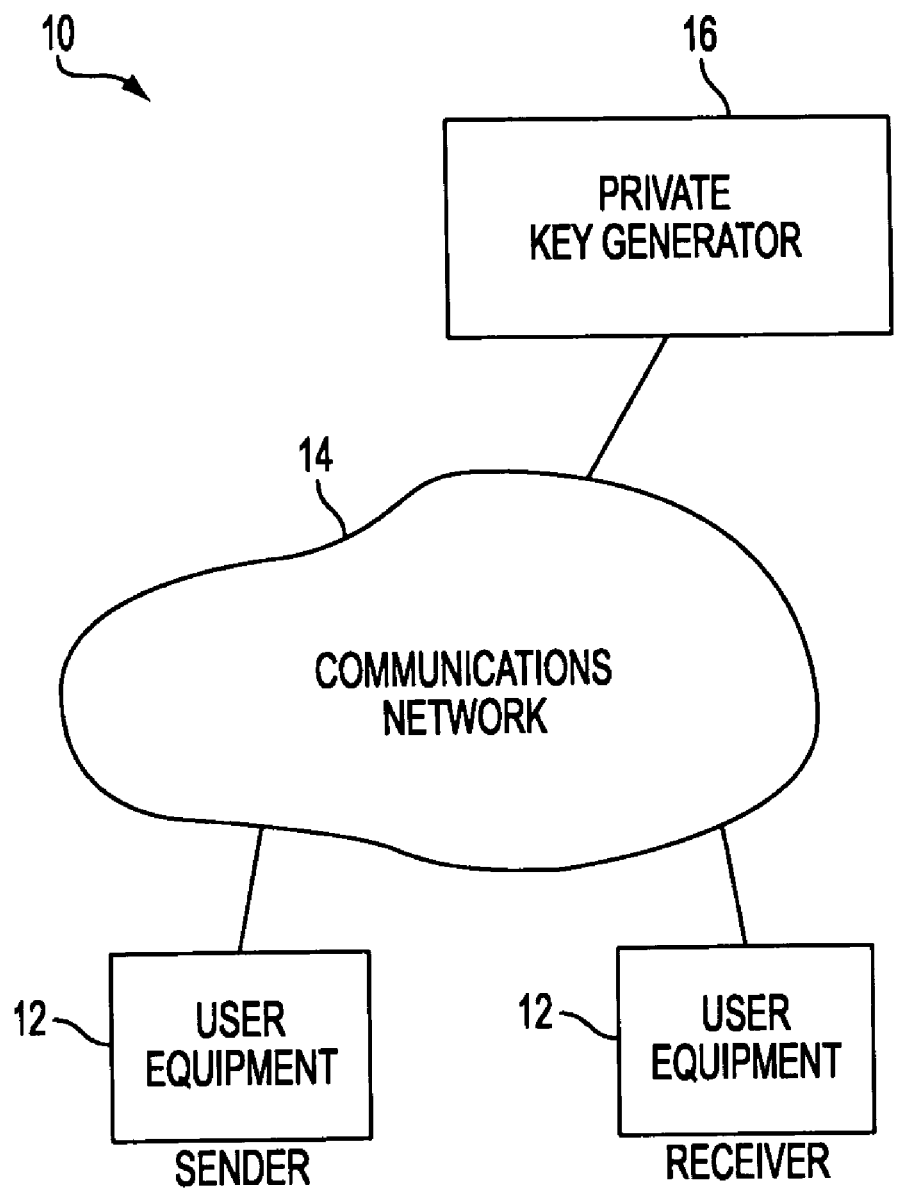
FIG. 1 is a diagram of an illustrative identity-based encryption system for supporting secure electronic messaging in accordance with the present invention.

A portion of an illustrative identity-based-encryption cryptographic system 10 in accordance with the present invention is shown in FIG. 1. System 10 allows users at various locations to communicate securely using an identity-based-encryption scheme. The users in the system may be individuals, organizations, or any other suitable parties or entities. Users may communicate with each other using user equipment devices 12. Equipment 12 may, for example, include computing equipment such as a personal computers, portable computers, mainframe computers, networked computers or terminals, telecommunications equipment, handheld computers or personal digital assistants, or cellular telephones. Multiple users may use the same device. For example, a group of users may share the use of a single computer terminal that is connected to a host computer in a local area network. These are merely illustrative examples of the type of platforms that the users of system 10 may use. User equipment 12 may be based on any suitable electronic equipment if desired.

The user equipment devices may be interconnected by a communications network 14. Network 14 may be, for example, the Internet, a local area network, a wide area network, the public switched telephone network, a virtual private network, a wired network, a wireless network, dedicated leased lines, a network based on fiber-optic or cable paths or other wired or wireless paths, or a network formed using any other suitable network technology or a combination of such networks.

Various computing devices may be connected to network 14 to support the features of the identity-based encryption scheme. For example, computing equipment at a private key generator 16 may be used to distribute private keys. In some arrangements, such computing equipment may be used to provide the functions of a server in a client-server architecture. For clarity, the present invention will sometimes be described in the context of such server-based arrangements. This is, however, merely illustrative. Any suitable computing device arrangement may be used to distribute private keys and other information for supporting encrypted communications in system 10 if desired. A typical server-based arrangement may use one or more computers to provide the functions of a server. A server may be formed using a single computer or multiple computers. If desired, the functions of a single server may be provided by computers that are distributed over a number of different physical locations.

Private key generator 16 may be based on a suitable computing platform such as a server-based platform that is connected to communications network 14. If desired, the key generation functions of private key generator 16 may be divided among multiple computers at one or more locations (each of which may have only part of the secret information needed to generate the private keys). For clarity, the present discussion will focus primarily on private key generator arrangements in which each private key generator 16 individually generates its own private keys for its own associated users.

Some user activities, such as sending person-to-person email messages, require manual intervention. For example, a person who desires to send such a message must compose the message before it is encrypted and sent to the appropriate recipient.

Other user activities in system 10 may be automated or semiautomated. These user activities may take place with little or no manual intervention. As just one example, the user at one device 12 may be a banking institution that desires to use encrypted communications to deliver encrypted bank statements to account holders at other devices 12 over communications network 14. The distribution process may be automated so that no operator intervention will generally be needed at the banking institution's equipment once the system has been properly set up. User receipt of the statements may also be automated.

Identity-based encryption schemes can be implemented using a number of different cryptographic algorithms. One such scheme is based on quadratic residues (see, e.g., "An Identity Based Encryption Scheme Based on Quadratic Residues," Eighth IMA International Conference on Cryptography and Coding, December 2001, Royal Agricultural College, Cirencester, UK, by Clifford Cocks). Another suitable scheme is based on elliptic curves (see, e.g., "Identity-Based Encryption from the Weil Pairing," by Dan Boneh and Matthew Franklin, extended abstract in Advances in Cryptology—Crypto 2001, Lecture Notes in Computer Science, Vol. 2139, Springer-Verlag, pp. 231-229, August 2001. See also http://eprint.iacr.org/2001/090 by Dan Boneh and Matthew Franklin). With the approach described in the work of Boneh arid Franklin, identity-based encryption is based on the properties of bilinear maps such as a Weil Pairing or Tate Pairing. For clarity, aspects of the present invention will sometimes be described in the context of an identity-based encryption scheme such as the elliptic curve implementation described by Boneh and Franklin. This is, however, merely illustrative. Any suitable approach for identity-based encryption may be used with system 10 if desired.

The messages sent from a sender at one device 12 to a recipient at another device 12 may be any digital information (e.g., text, graphics, audio, video, commands, executable code, data, etc.) that is to be electronically conveyed in a secure manner. Initially, when the system is set up, private key generator 16 of FIG. 1 obtains or generates a master secret s. For example, the private key generator may create a master secret from a number that is randomly generated at the private key generator by a processor housed inside a tamper-proof enclosure. The master secret may also be produced off-site and delivered to the private key generator 16. The master secret (also sometimes referred to as a secret master key or a master key) is secret information that will subsequently be used by the private key generator 16 to generate private keys for receivers in the system to use in decrypting messages and to generate public parameter information for use by senders in encrypting messages.

After the master secret s has been obtained, the private key generator may generate public parameter information. In the identity-based encryption approach of the above-mentioned work of Boneh et al., the public parameter information that is generated includes public parameters P and sP. The parameter P may first be generated by the private key generator (e.g., using a random number generator). The parameter sP may then be generated by the private key generator. The "multiplication" of s by P in the Boneh and Franklin work is accomplished using the multiplication of integers with points on elliptic curves. While multiplication (calculating sP) is straightforward, the inverse operation (determining s from knowledge of P and sP) is essentially impossible.

The public parameter information (e.g., the parameters P and sP in an identity-based encryption process based on elliptic curves) may be numbers. In general, there is an equivalency between numbers, letters, symbols, and other such schemes for representing information. Sometimes certain information (e.g., the master secret or public parameters) will be described as being in number form and sometimes certain information (e.g., a user's identity) may be described as being at least partly in character form (e.g., in the form of an email address). Because of the inherent equivalency between these different representational schemes, the techniques involved in converting letters or symbols into numbers or for representing multiple numbers or strings as a single number or other such operations are not described in detail herein.

After the public parameter information (e.g., the public parameters P and sP) has been determined, the private key generator may publish this information. For example, this information may be made available over the communications network 14 using computing equipment (e.g., a server) at private key generator 16. The public parameter information may be sent to users via email. If desired, the public parameter information may be provided to users on demand (e.g., by downloading from a server, in the form of a message, or using any other suitable arrangement). Public parameter information (e.g., the public parameters P and sP) may be distributed as part of a downloadable or preinstalled software module or package. For example, the public parameter information may be incorporated into an email application, web browser, or other communications or Internet application that is distributed with the user's personal computer or other user equipment 12 or that is downloaded (e.g., in the form of a plug-in or stand-alone package) at a later time.

If the public parameter information includes more than one parameter, the parameters may be distributed together or separately. For example, parameters P and sP may be distributed together or separately. If parameters P and sP are distributed separately, each parameter may be distributed using a different distribution mechanism. For example, P may be built into the user's software and sP may be distributed over the Internet. Moreover, P and sP may be combined to form the equivalent of a single number or parameter or may be subdivided (e.g., to form three or more public parameter sub-parts). If desired, public parameter information (e.g., public parameters P and sP) may be distributed manually (e.g., by printed mail or by distributing a diskette or other computer-readable media to the user).

There may be multiple private key generators in system 10. Moreover, private key generators may generate multiple versions of the public parameter information (e.g., based on different P values—$P_{VERSION-1}$, $P_{VERSION-2}$, etc.). The public parameter information for each private key generator and for each version may be distributed using any of the above-mentioned distribution techniques or a combination of such techniques or other suitable distribution techniques. These distribution methods are merely illustrative. Any suitable technique may be used to publish the public parameter information if desired.

Once the public parameter information (e.g., public parameters P and sP) has been provided to a user (i.e., a sender) who desires to send an encrypted message to another user (i.e., a recipient), the sender may encrypt and send the message to the recipient. When the recipient receives the encrypted message, or earlier, when the recipient sets up or updates the equipment at the recipient's location, the recipient obtains the recipient's private key from the private key generator.

Identity-based encryption (IBE) is so named because the encryption process at the sender uses as inputs: (1) the public parameter information and (2) a public key Q based on the recipient's identity. The identity of a user may be represented by any suitable string, number, or symbol. For example, the identity of a message recipient may be represented by that recipient's email address, name, or social security number. An advantage of IBE schemes is that a sender can generally determine the identity (e.g., the email address) of an intended recipient without all of the complexities involved in obtaining the RSA-public key of the intended recipient as would be required with traditional public-key cryptographic schemes. For example, the IBE public keys may be the same as (or based on) user email addresses, which are readily obtainable.

The private key generator 16 may generate private keys for each of the multiple users associated with that private key generator based on the public keys (the Q's) of each of these users (i.e., based on the users' identities).

The form of public key Q that is used in system 10 depends on the security features that are desired. For example, user privileges may be made to automatically expire in system 10 by automatically concatenating a validity period (e.g., a date or date range such as the current day of the year and year, the current month, starting and ending dates such as Jan. 2, 2003-Jan. 10, 2003, or any other suitable time-related date-stamp information) with each user's email address to form Q values based not only on the users' identities (i.e., email addresses) but also validity period information.

As another example, users' privileges may be restricted based on security clearance level, by concatenating or otherwise adding security clearance level information to each user's email address when forming the public keys Q (i.e., Q=joe@navy.com|top_secret, etc.). These approaches are merely illustrative of the ways in which additional criteria may be added to a user identity such as a user email address when forming the public key for each user (e.g., the Q for each user). Any suitable approach for forming the public keys may be used if desired.

A sender that desires to send an encrypted message to a given recipient generally must know the recipient's identity (e.g., the recipient's email address) and, if applicable, must know how to construct the user's public key Q from the additional public key information (e.g., validity period, security level, etc.) The sender must also obtain the public parameter information (e.g., P and sP). Prior to message transmission, the sender may use the identity-based-encryption (IBE) process (e.g., the process of the work of Boneh and Franklin described above) to encrypt the message contents for the recipient. The IBE process may take as inputs (1) the message to be encrypted, (2) public parameter information (e.g., P and sP), and (3) the public key Q that is based on the identity of the given recipient to which the message is to be sent. The IBE process produces an encrypted version of the message as its output.

After the sender transmits the encrypted message to the recipient over communications network 14, the recipient may receive and decrypt the received message using an appropriate private key. The private key that is used for decrypting the message is related to the identity-based-encryption public key Q and public parameter information (e.g., P and sP) used when encrypting the message only the private key that matches the public key may be used to decrypt the message. Generation of the private key requires knowledge of the master secret s, so only the private key generator 16 can generate the recipient's private key based on the recipients public key Q.

With one suitable approach, the private key for the recipient may be generated from the recipient's identity Q and the master secret s by using an appropriate mathematical function (e.g., the multiplication of integers with points on elliptic curves) to calculate the value of sQ. The recipient's identity may be verified using authentication information from the recipient before the private key is issued to the recipient.

Any suitable manual or automatic authentication technique may be used. For example, the recipient may be asked to fax or mail a letter to the private key generator 16 on the recipient's official letterhead, which is examined for authenticity by personnel or automated equipment at the private key generator. As another example, biometric identification techniques (e.g., fingerprint analysis, eye-scanning, handprint or voiceprint analysis, facial recognition methods, or in-person identification checks) may be used. When the authentication process involves electronic communications between the recipient and the private key generator, the communications path between the recipient and the private key generator should be secure. The communications path may be assumed to be secure if it is not available for use by untrusted parties. For example, the network between the private key generator 16 and the recipient may be a private line that is controlled by the private key generator or another trusted entity. As another example, a secure channel may be supported using a secure web browser link (e.g., using the secure sockets layer protocol).

Regardless of how the private key generator 16 authenticates the identity of the recipient and generates the recipient's private key, the private key should be provided to the recipient for use in decrypting the message. Any suitable technique may be used to provide the private key to the recipient. For example, the private key may be transmitted to the recipient in an email or other suitable message, may be made available for downloading over the Internet (as part of a stand-alone downloadable application or a downloadable plug-in module, as a stand-alone key, etc.). A secure communications channel may be used for electronic communications between the private key generator 16 and the recipient's equipment 12. If desired, the private key may be preinstalled on the recipient's equipment, so that the private key will be available for the recipient when the recipient first uses the equipment. The private key may also be distributed by mail or courier (e.g., on a computer-readable medium such as a computer disk or memory chip).

The recipient may, if desired, store the private key locally (e.g., in a database on a storage device such as a memory circuit or hard drive on the recipient's equipment). If the private key is stored locally, the recipient can retrieve it the next time a message needs to be decrypted without needing to contact the private key generator to obtain a new copy of the private key over the communications network. If the private key is not located locally, the recipient may obtain the private key from the appropriate private key generator by consulting a previously-stored local list of private key generators, by consulting private key generators listed in a directory, by contacting one or more private key generators based on information provided with the message, or using any other suitable technique.

To enhance the efficiency of the decryption and encryption process, a two-step decryption technique may be used in which a message key (e.g., a symmetric message key) is used to encrypt the contents of the message prior to transmission to the recipient. The IBE process is then used to encrypt the symmetric message key. The message that is sent from the sender to the recipient contains the IBE-encrypted message key and the message-key-encrypted message contents. At the recipient, the recipient uses the IBE private key to decrypt the message key. The message key may then be used by the recipient to decrypt the rest of the message.

"Pure" or "single-step" identity-based encryption algorithms in which the IBE algorithm alone is used to encrypt the entire message payload can be computationally intensive. For example, a pure identity-based encryption scheme may be able to encrypt data at the rate of roughly 1000 bytes/second, whereas a symmetric encryption algorithm such as DES3 (3-DES—Data Encryption Standard) may be able to encrypt data at a rate of about 100 Mbytes/second. Moreover, with pure IBE algorithms the size of an IBE-encrypted block of data may be many orders of magnitude larger than the unencrypted version of the same block of data. Accordingly, it may be desirable to use the two-step identity-based encryption scheme to allow the sender and recipient to securely exchange message keys such as symmetric message keys. This type of two-step IBE cryptographic scheme uses IBE to securely exchange a message key, while encrypting and decryption most message data using an efficient message key cryptographic process (e.g., 3-DES or AES).

The two-step encryption strategy in which "pure" IBE is used in conjunction with a more efficient encryption technique (e.g., a symmetric key encryption technique such as 3-DES or AES) can improve the overall IBE encryption efficiency of system 10. Such hybrid or "two-step" IBE encryption schemes are sometimes referred to herein as simply "identity-based-encryption" schemes or "IBE" schemes for clarity. Similarly, pure IBE schemes (in which only IBE is used for encryption and decryption) are sometimes referred to herein as "identity-based-encryption" or "IBE" schemes.

In two-step IBE algorithms, the message key encryption technique (e.g., the 3-DES technique or other symmetric key technique) can be chosen for its efficiency in encrypting data, which can make such mixed algorithms significantly more efficient than using a "pure" IBE encryption strategy in which all of the message data is encrypted using the IBE encryption algorithm. With one suitable two-step approach, which is described in more detail below, an IBE-encrypted message key may be transmitted to the recipient of a message in an encrypted-message key field.

Figure 2:
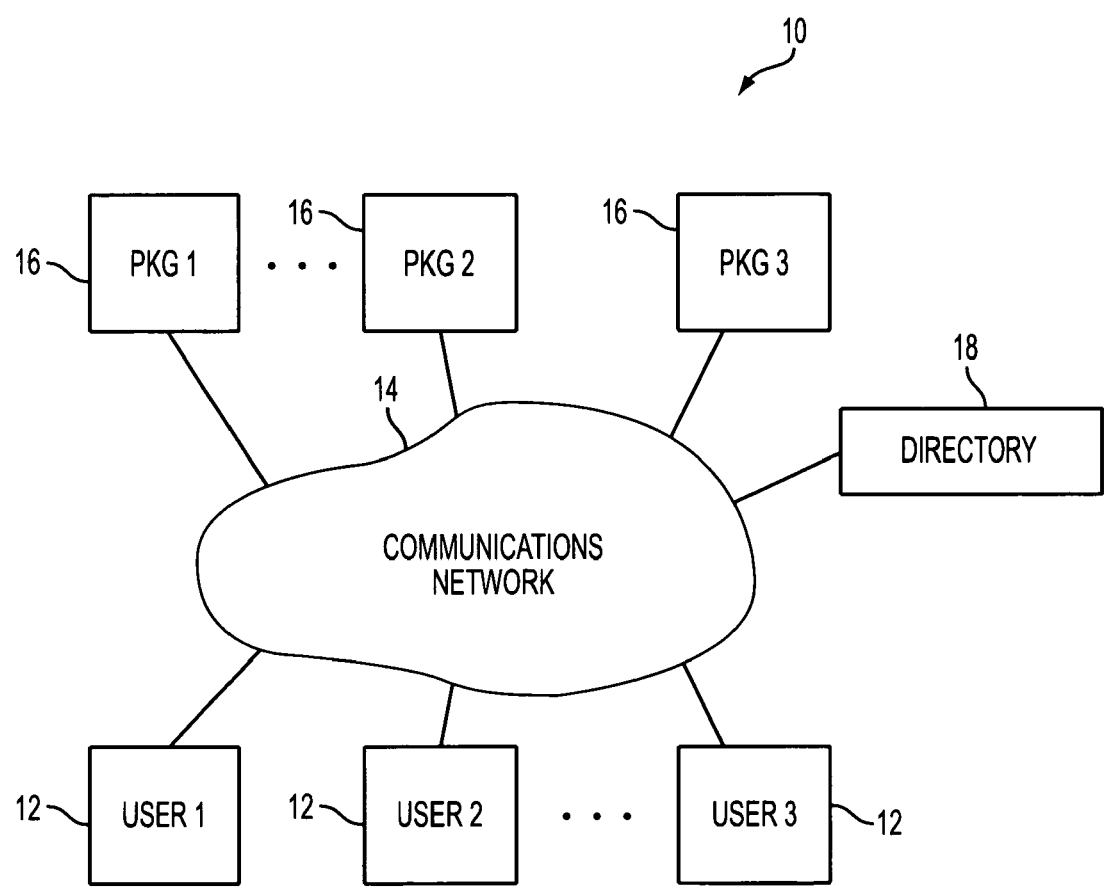
FIG. 2 is a diagram of an illustrative identity-based encryption system having multiple private key generators for supporting secure electronic messaging in accordance with the present invention.

As shown in FIG. 2, there may be more than one private key generator 16 in system 10. For example, different institutions (e.g., different banks, brokerage houses, corporations, military establishments, branches of government, educational institutions, etc.) may each have a separate associated private key generator. In general, each private key generator has its own master secret and its own public parameter information (e.g., its own set of public parameter information P and sP in environments using an approach of the type described in the above-mentioned work of Boneh and Franklin).

For proper communications between a sender and a recipient, the actions of the sender and recipient must be coordinated. In particular, the sender must use public parameter information in encrypting the message that comes from the same private key generator that the recipient uses to obtain the private key. When there are multiple possible private key generators 16 associated with any given user in system 10, it is beneficial to provide a directory or other suitable mechanism for informing senders of which private key generator is associated with a given user.

For example, to encrypt a message properly for a given recipient, a sender may consult a directory service 18 or other suitable equipment connected to network 14 to look up the recipient's private key generator affiliation. For example, if a sender desires to send an encrypted message to a member of an organization that has an associated private key generator, the sender may consult a directory 18 to locate the private key generator information for members of that organization. This information may identify the private key generator by name or Internet location or other suitable identifier. The identifying information may then be used by the sender to contact this private key generator (or other suitable source) to obtain the appropriate public parameter information to use when encrypting the message for the recipient. If desired, the appropriate public parameter information itself may be provided directly in the directory 18.

This type of directory arrangement allows senders to determine which IBE public parameter information to use in encrypting a message for a given user. Public parameter information may also be distributed by publishing it using other suitable arrangements. The appropriate public parameter information (e.g., parameters P and sP) to be used in encrypting a sender's message is the public parameter information that was generated using the same master secret (s) used in generating the intended recipient's IBE private key (sQ). When there is a correspondence between public parameter information and private keys, messages can be properly encrypted and decrypted using the IBE scheme.

Some users in system 10 may have relationships with more than one private key generator. For example, a user may receive IBE-encrypted communications from a bank having a first private key generator and from an employer having a second private key generator.

In this type of multi-private-key-generator environment, receivers may have multiple private keys and may therefore need to determine which of the private keys is the correct one to use to decrypt a given incoming message.

Moreover, senders of messages in system environments with multiple private key generators will generally need to determine which public parameter information is the appropriate public parameter information to use (e.g., the public parameter information associated with the bank private key generator, the public parameter information associated with the employer private key generator, or the public parameter information associated with some other entity) before a message may be encrypted.

Senders may determine which public parameters to use in encrypting a message by looking up information on the intended receiver in a directory of users (e.g., a directory such as directory 18). Senders may also obtain information on the appropriate public parameter information to use from a private key generator, from a recipient, or other suitable source.

When a recipient receives a message, the recipient can attempt to decrypt the message using each of the recipient's private keys. This may produce success in decrypting the message without need for further action, but can sometimes require a number of steps (e.g., when the process of obtaining the private key involves user steps such as responding to a pop-up password window or other authentication steps for each attempt).

If desired, receivers can look up information on private key generators in a directory. As an example, if a receiver receives a decrypted message, the user may try to obtain an appropriate private key at some or all of the private key generators listed in the directory. This approach may be particularly satisfactory in systems 10 in which there are not a large number of different private key generators.

Figure 3:
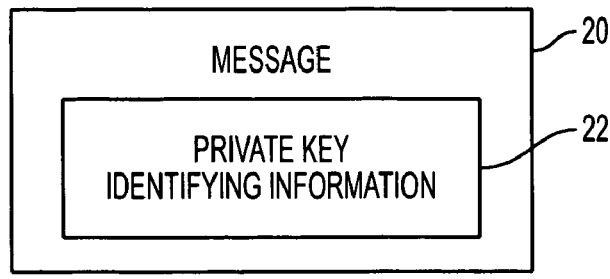
FIG. 3 is a diagram of an illustrative message with associated private key identification information in accordance with the present invention.

With another suitable arrangement, the sender may assist the recipient in locating the correct private key by providing private key identifying information with the message. The private key identifying information can be used by the recipient to identify which of the recipient's private keys is the correct one to use in decrypting the message. A diagram of an illustrative message 20 containing private key identification information 22 is shown in FIG. 3.

Information in the header of message 20 such as information on the sender's email address may be used as the private key identifying information 22. In this situation, the recipient may determine the appropriate private key to use from the context provided by the sender's email address. For example, when a recipient receives a message that is identified as originating at the recipient's bank (e.g., if the sender information contained in the message header matches that for the recipient's bank), the recipient can surmise that the private key generator of the recipient's bank is associated with the message and that the appropriate one of the recipient's private keys to be used in decrypting the message is the private key that is associated with the bank's private key generator. Because the public parameter information that the bank used to encrypt the message for the recipient was generated by the same private key generator that was used to generate the private key, the private key can be successfully used to decrypt the message.

Sometimes there is no preexisting relationship between sender and recipient or there may be difficulties in ascertaining the sender's identity from the usual message header information. It may therefore be useful to provide other types of private key identifying information 22 with the message 20. For example, the name of the private key generator associated with the encrypted message may be used as the private key identifying information. This name may be provided as a text string, as a number, as a URL or IP address specifying the location of the private key generator 16 on network 14, or as any other suitable identifier that may be used to uniquely or accurately identify the private key generator 16. With this information, the recipient of a given message can easily locate the appropriate private key generator 16 and can request a private key from that private key generator that can then be used to decrypt the given message.

Figure 4:
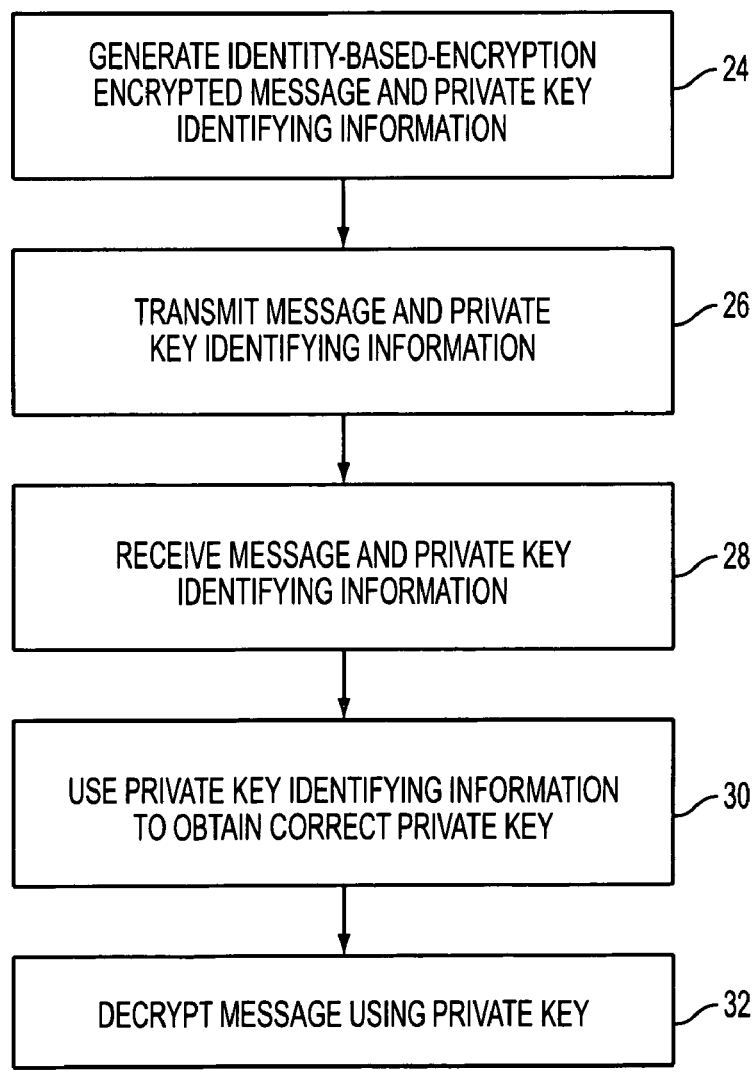
FIG. 4 is a flow chart of illustrative steps involved in sending secure email messages using identity-based-encryption cryptographic techniques in accordance with the present invention.

Illustrative steps involved in using the private key identifying information in sending and receiving secure messages in system 10 are shown in FIG. 4. At step 24, an IBE-encrypted message and associated private key identifying information may be generated at the sender. For example, a message key may be used to encrypt a message payload and an IBE encryption process may be used to encrypt the message key. The message to be transmitted over the network may be constructed from the encrypted message payload and the encrypted message key. The IBE encryption process may use the public key Q of the intended recipient and public parameter information from a given private key generator that is associated with the recipient as inputs when encrypting the message key. The sender may append private key identifying information (e.g., a server name or other information that specifically identifies the given private key generator involved) to the message.

The encrypted message with its associated private key identifying information may be transmitted from the sender to the receiver at step 26.

At step 28, the recipient may receive the encrypted message and the private key identifying information.

At step 30, the private key identifying information may be used by the recipient to identify which private key of the recipient is to be used to decrypt the message and may be used to obtain a copy of that private key.

For example, the private key identifying information may identify the network location of the specific private key generator that was used in generating the IBE public parameter information that was used in encrypting the message (i.e., that was used in encrypting the message key). The private key identifying information may identify the private key directly (e.g., through an identifier directly associated with the private key) or indirectly (e.g., by identifying the private key generator associated with the private key or the public parameters that are associated with the private key generator that is associated with the private key, etc.). These are merely illustrative examples. Any suitable private key identifying information may be used that allows the recipient to identify which of the recipient's private keys to use.

The identified private key may be retrieved from a local private key database at the recipient. If the private key is not available in the local database, the recipient may obtain the private key from the appropriate private key generator. The recipient may, for example, obtain the private key by contacting the appropriate private key generator 16 over network 14 manually, automatically, or using a combination of manual and automatic steps. The private key generator may authenticate the recipient's identity and verify that the recipient is authorized to access the message content, before generating an appropriate private key (e.g., a key sQ that is based on the recipient's identity-based IBE public key and the master secret of that private key generator). If desired, the recipient may retain the private key (e.g., in the local private key database). The local private key database may be implemented using a memory device, hard drive or other local storage on the recipient's equipment. The stored private key may be retained until needed by the recipient when the next message associated with the same private key generator is received.

At step 32, the recipient (i.e., the equipment 12 that received the message) may use the private key that has been obtained to decrypt the message. In a pure IBE arrangement, the private key may be used to decrypt an IBE-encrypted payload. In a two-step IBE scheme, the private key may be used to decrypt the IBE-encrypted message key. The message key that has been decrypted may then be used to decrypt the message-key-encrypted payload.

Figure 5:
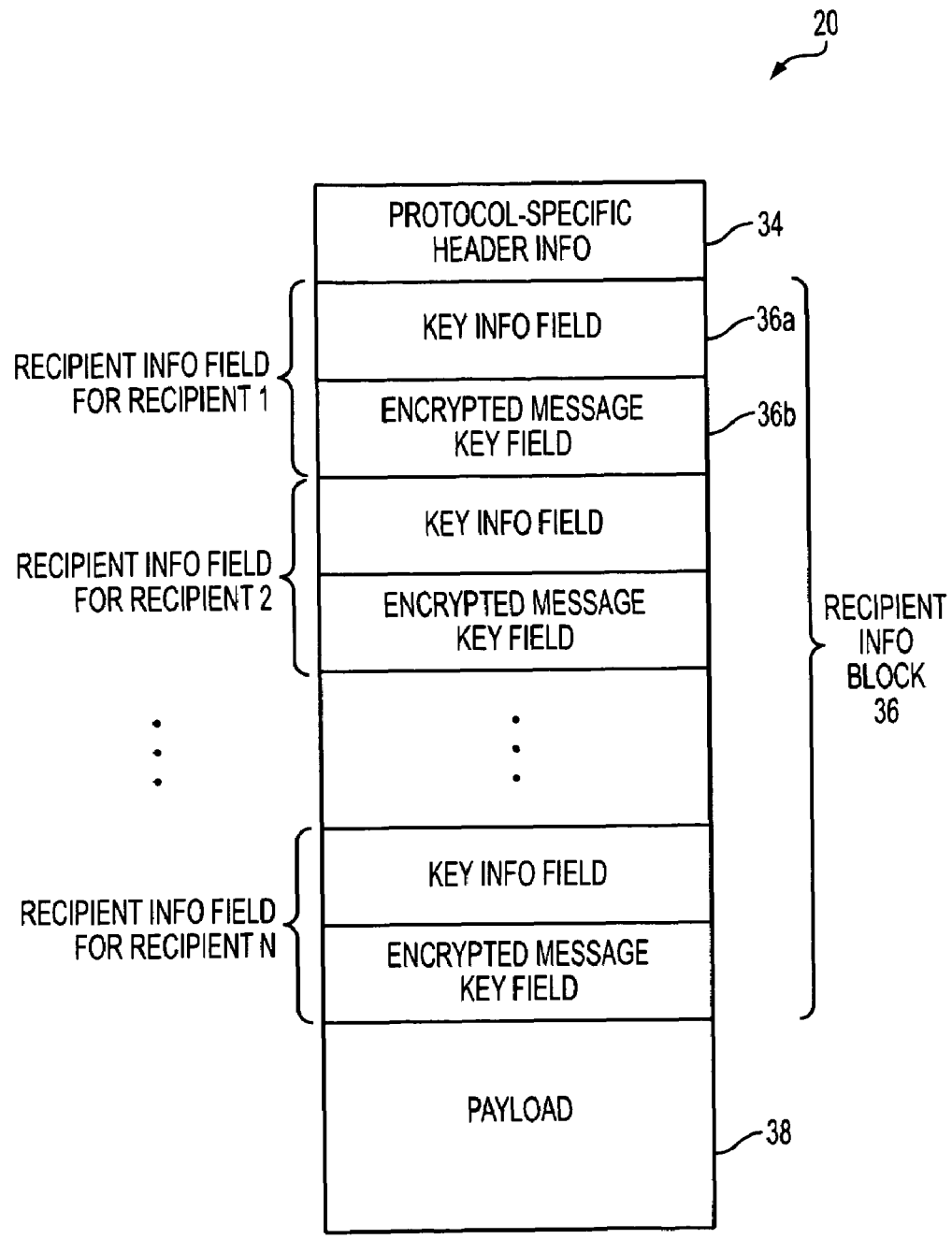
FIG. 5 is a generalized diagram of an illustrative message in accordance with the present invention.

The messages that are exchanged in system 10 may be instant messages, email messages, or any other suitable type of messages. An illustrative message format is shown in FIG. 5. In the example of FIG. 5, message 20 has a header 34, recipient info block 36, and a payload portion 38. The header 34 may include protocol-specific information such as recipient email address information, sender email address information, subject information, date of transmission information, etc. The payload 38 may be any suitable text, media, code, or other content. The payload may be encrypted using a message key (e.g., a symmetric message key such as a 3-DES key or an AES key). The message key may be encrypted using IBE. The IBE-encrypted message key may be placed in the recipient info block 36.

The recipient info block 36 may contain a recipient info field having a key info field 36a and an encrypted message key field 36b for each recipient of the message. If there is only one recipient, for example, the recipient info block 36 may include a single key info field and a single corresponding encrypted message key field.

The IBE-encrypted message key may be placed in the encrypted message key field. When there are multiple recipients, the message key may be encrypted differently for each encrypted message key field. For example, the copy of the message key to be used by recipient 1 may be encrypted using IBE based on the public key for recipient 1 and the public parameter information obtained from private key generator 1, whereas the copy of the message key to be used by recipient 2 may be encrypted using IBE based on the public key of recipient 2 and the public parameter information obtained from private key generator 2. The resulting encrypted message keys may be stored in corresponding encrypted message key fields. The key info fields 36a in each recipient info field may be used to identify which recipients are associated with which recipient info fields. The private key identifying information for each recipient may, if desired, be provided in the key info field associated with that recipient.

Figure 6:
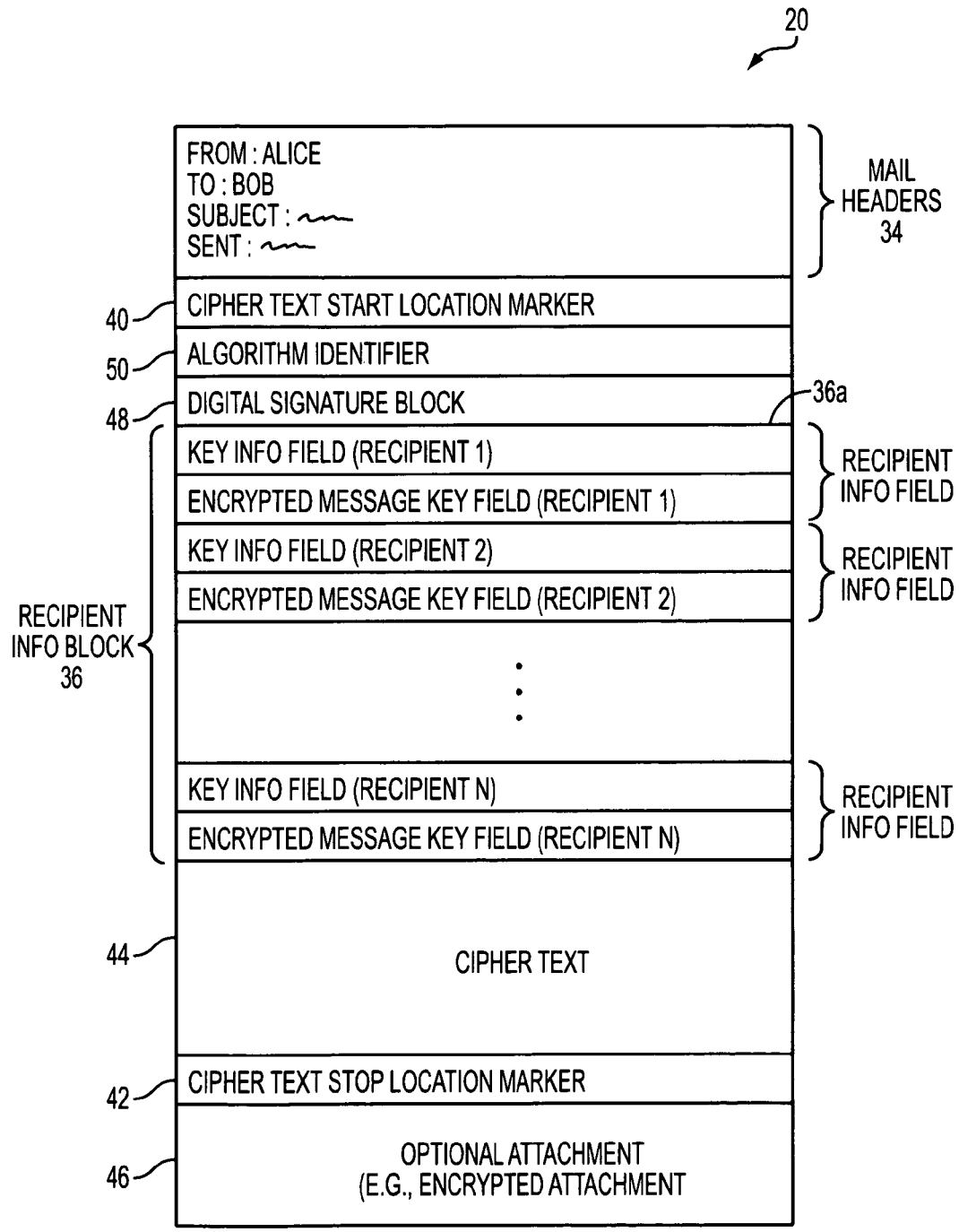
FIG. 6 is a diagram of an illustrative embodiment of a suitable message format that may be used in accordance with the present invention.

The message 20 may be an email message that uses a format based on that of standard S/MIME email messages, as shown in FIG. 6. As the diagram of FIG. 6 illustrates, message 20 may have S/MIME mail headers 34. Information from the mail headers 34 of FIG. 5 or FIG. 6 such as the identity of the sender may be used as private key identifying information. For example, a recipient may use header information from headers 34 to determine that a given message was sent from the recipient's bank. The recipient may then use this information to obtain a private key from local storage or from the recipient's bank's private key generator. Private key identifying information may also be provided in recipient info block 36 (e.g., in each key info field 36a).

Ciphertext start location marker 40 and ciphertext stop location marker 42 may be used to identify the location of the encrypted contents of message 20 (e.g., the location of ciphertext 44). Message 20 may, if desired, have one or more attachments 46, which may, if desired, be encrypted.

A sender that desires to sign a message 20 may do so by placing a digital signature in digital signature block 48. The sender may generate the digital signature using any suitable technique. For example, the sender may generate the digital signature using an RSA private key that the receiver can verify with a corresponding RSA public key.

Algorithm identifier block 50 may be used to hold an algorithm identifier that specifies which encryption algorithm or algorithms are being used to encrypt the message 20. For example, the algorithm identifier may specify that the IBE algorithm Version 2.2 is being used to encrypt the message key and that 3-DES encryption algorithm is being used as a message-payload encryption algorithm to encrypt the message payload (i.e., the message key is a 3-DES message key). Other illustrative algorithm IDs include IBE+3-DES, IBE+AES, IBE v.3+3-DES, IBE v.4+3-DES, etc. The algorithm IDs may be represented using an alphanumeric string, binary code, or other suitable representation. There may be a separate algorithm identifier entry for each recipient or a single algorithm identifier that specifies the cryptographic algorithm(s) that are being used for all recipients. The format of the algorithm identifier block 50 may, if desired, conform to the S/MIME email standard.

Figure 7:
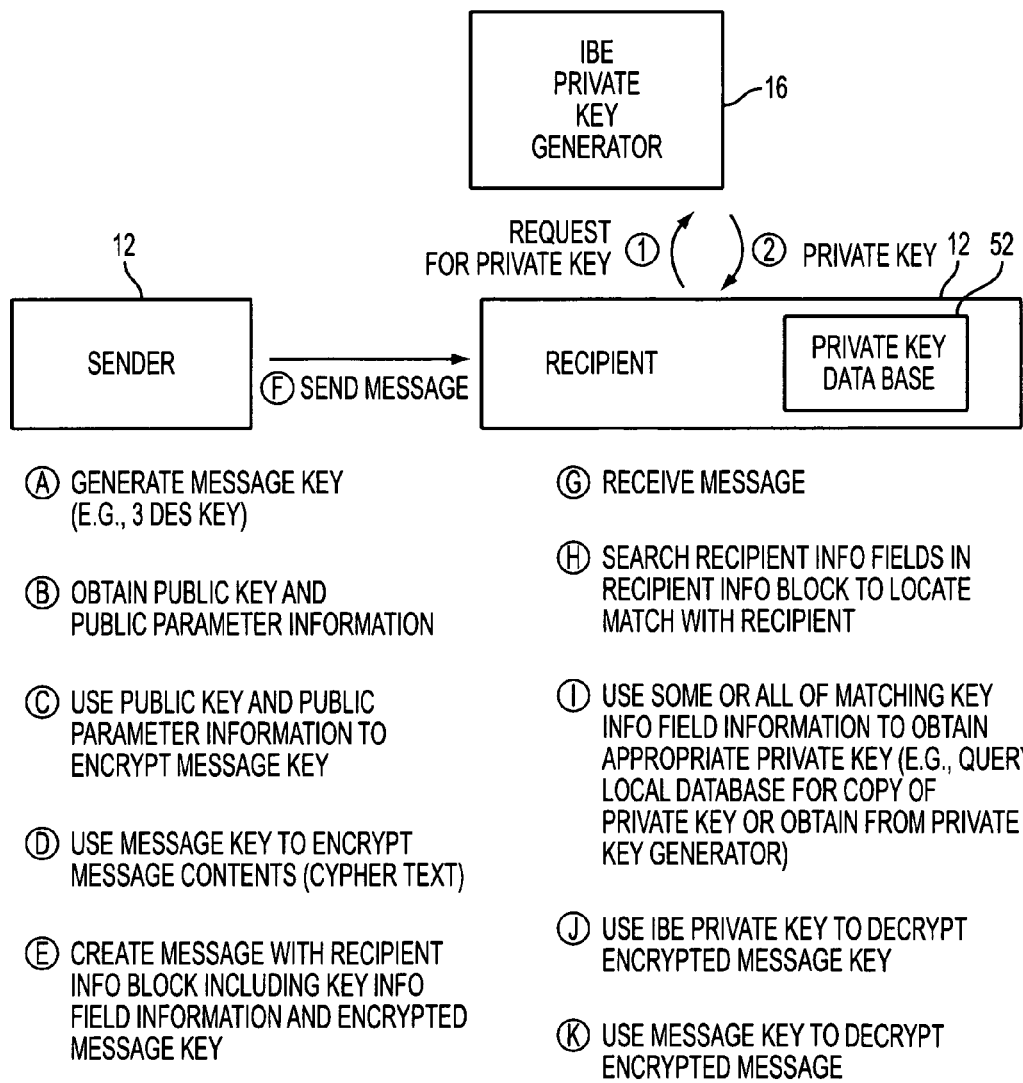
FIG. 7 is a diagram that illustrates how identity-based encryption may be used to send secure messages between a sender and a recipient in accordance with the present invention.

The diagram of FIG. 7 illustrates how IBE cryptographic techniques may be used to support secure messaging between a sender and a recipient.

At an appropriate time (e.g., during a set-up process or later when a recipient needs to decrypt a message) the recipient may be provided with an IBE private key. With one illustrative approach, the recipient may request a private key (step 1) which may be delivered from the private key generator 16 to the recipient (step 2). The recipient may store the private key in private key database 52. When a message is to be decrypted, the recipient may query database 52 to attempt to locate a local copy of the private key before requesting that the key be delivered electronically over a network.

To send a message, a sender may generate a message key (e.g., a 3-DES or AES message key) (step A). The sender then obtains the public parameter information (e.g., public parameters P and sP) for the intended recipient and the IBE public key Q of the intended recipient (step B). The public parameter information may be published on the Internet by a directory service, by a private key generator associated with the recipient, by the recipient, or any other suitable entity. The public key is based on the recipient's identity. For example, the public key may be based on the recipient's email address. Additional information may be provided in the public key to add additional security features to system 10. For example, a validity period may be appended to the email address to form the public key.

The sender encrypts the message key (step C) using the IBE public key and IBE public parameters as inputs to the IBE encryption algorithm running at the sender.

The message key (in its unencrypted form) is used to encrypt the message payload (e.g., a text or media file, code, etc.) (step D).

At step E, the message may be constructed from the encrypted payload. The IBE-encrypted version of the message key may be placed in the encrypted message field of the recipient info block. The message may be addressed to multiple receivers (each of which may receive a message key that has been encrypted using an appropriate corresponding identity-based public key and potentially different public parameter information). The recipient info block may contain recipient info fields that each contain information for identifying which recipient is associated with the contents of each associated encrypted message key field. The recipient info fields may also contain information that identifies for the recipients which of their potentially numerous private keys is to be used to decrypt their encrypted message key (private key identifying information).

The message may be sent at step F. For example, an email program or application with an email function may be used to send the message.

At step G, the recipient may receive the message. For example, the recipient may use an email program or an application with an email function to receive the message.

At step H, the recipient may search each of the recipient info fields 36a to determine whether there is a match between the recipient and the information in any of the fields. If there is no match, the message is not destined for the recipient and can be discarded.

If there is a match, the recipient can (at step I) use some or all of the matching key info field information to obtain the appropriate private key needed to decrypt the encrypted message key and thereby access the message contents (i.e., the recipient can use the private key identifying information in the key info field to obtain the appropriate private key). The recipient may obtain a previously-stored private key from database 52 or may obtain the private key from an appropriate IBE private key generator 16. The private key identifying information may include information sufficient for the recipient to identify the correct private key in database 52 and/or to request the correct private key (at step 1) from the correct private key generator 16 (e.g., in a multi-private-key-generator environment).

At step J, the IBE private key of the recipient may be used to decrypt the encrypted message key for the recipient (obtained from the recipient's encrypted message key field).

At step K, the decrypted version of the message key may be used to decrypt the encrypted payload (e.g., ciphertext 44 of FIG. 6), thereby providing the recipient with access to the contents of the message.

As described above, private key identifying information may be sent with message 20. The private key identifying information and other message information may, for example, be provided in the key info fields 36*a* of an email message. Any suitable configuration may be used for recipient info fields 36 and their associated key info fields 36*a* and encrypted message key fields 36*b*. Illustrative key info fields 36*a* are shown in FIGS. 8*a*, 8*b*, 8*c*, 8*d*, 8*e*, and 8*f*. Message 20 may contain one or more of any of these illustrative key info fields 36*a* or other suitable recipient info fields. Typically each key info field 36*a* is associated with a particular recipient and contains information that is sufficient for the recipient to confirm this association. Once a recipient locates a matching key info field 36*a*, the recipient can use the encrypted message key that has been provided in the corresponding encrypted message key field 36*b* to decrypt the message payload.

Figure 8A:
FIGS. 8a, 8b, 8c, 8d, 8e, and 8f are diagrams of illustrative recipient info fields that may be used in accordance with the present invention.

As shown in FIG. 8*a*, the key info field 36*a* of message 20 may include recipient identifier information that is based on the recipient's email name. For example, "bob@aol.com" may be placed in the recipient info field 36*a*. When using this type of recipient info field 36*a*, each recipient may use the email name information to identify which corresponding encrypted message key is intended for that recipient.

Figure 8B:

As shown in FIG. 8*b*, a recipient identifier in the key info field 36*a* may be based on both the recipient's email address and a validity period. The validity period may be a date (e.g., Feb. 10, 2003), date range (e.g., Jan. 2, 2003-Feb. 22, 2003), or any other suitable time-based period over which the recipient is authorized to decrypt the encrypted contents of the message. With this approach, keys can be made to automatically expire or can be made to be valid only at a future date. The recipient identifier information of FIG. 8*b* may be used by each recipient to identify which corresponding encrypted message key field is associated with that recipient.

Figure 8C:
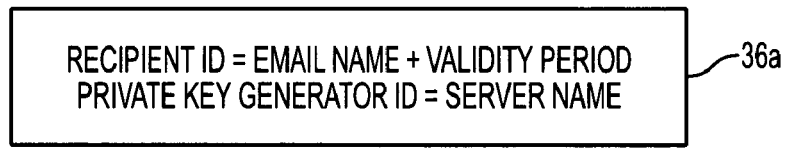

As shown in FIG. 8*c*, the key info field 36*a* may contain private key identification information. The private key identification information may be used by the message recipients to determine which of their private keys to use in decrypting a message (and, if a private key needs to be requested over network 14, which private key generator or other location should be contacted to obtain that private key).

In the example of FIG. 8*c*, the private key identification information is based on private key generator identification information (e.g., a private key generator ID in the form of a server name) and is provided in addition to the recipient ID. This private key generator information is sufficient to identify, for each recipient, which of their private keys is to be used. The private key generator ID may be used to formulate a local database query for locating the private key among a number of private keys stored in a local private key database on the recipient's equipment or may be used to formulate a request that directs the correct private key generator to generate the private key needed by the recipient to decrypt the encrypted message key (thereby allowing the recipient to decrypt the message contents).

The recipient IDs (which are based on email and validity period information in the example of FIG. 8*c*) may be used by the recipients of the message to determine which private key identification information corresponds to which recipients. In one suitable arrangement, a given recipient first locates a matching email address in the recipient ID portion of the key info field. The given recipient then uses the accompanying private key identification information (e.g., the server name in the example of FIG. 8*c*) to attempt to retrieve the appropriate private key for that given recipient to use from the given recipient's local private key database. If the private key cannot be located in the private key database, the server name can be used to identify which private key generator the recipient should contact to obtain a copy of the appropriate private key over network 14. Once the correct private key has been obtained by the given recipient, the given recipient can use that private key to decrypt the encrypted message key located in the encrypted message key field that is associated with the key info field in which the matching email address was found. The decrypted message key may be used to complete the message decryption process by decrypting the contents of the message.

Figure 8D:
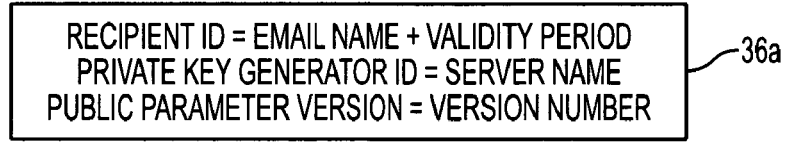

As shown in FIG. 8*d*, the key info field may have private key identification information such as public parameter version number information. The public parameters that are generated by private key generators 16 may be changed from time to time (e.g., periodically, or when the secrecy of the master secret of that private key generator may have been compromised). As an example, a private key generator 16 may initially generate public parameter information with a version number 1.0 and may later generate public parameter information with a version number 2.0. Because the recipient must use the private key that matches the correct public parameter version number in order to properly perform decryption activities, the recipient can use private key identification information that contains version number information to ensure that the correct private key is obtained and used. An example of a key info field containing public parameter version number information is shown in FIG. 8*d*. The public parameter version number is a form of private key identification information and may be provided in addition to private key identification information such as a private key generator ID based on a server name (or other suitable private key generator ID).

Figure 8E:

As shown in FIG. 8*e*, the key info field 36*a* may include public parameter information (e.g., the set of public parameters P and sP in a system environment of the type described in the above-mentioned work of Boneh and Franklin). The public parameter information that is included in the key info field 36*a* may be the same IBE public parameter information that the sender used when encrypting the message key in the corresponding encrypted message field 36*b*. The public parameter information of FIG. 8*e* may be provided in addition to the recipient ID, so that the recipient can use the recipient ID to locate the appropriate key info field in the message. The public parameter information is a form of private key identification information, because this information can be used to determine which private key the recipient is to use in decrypting the encrypted message key.

Figure 8F:
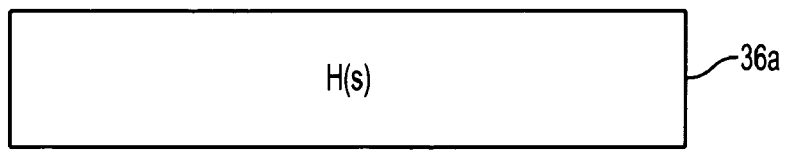

As shown in FIG. 8f, any of the key info field information of FIGS. 8a, 8b, 8c, 8d, and 8e or any other suitable key info field information may be processed using a hash function prior to insertion in the key info field 36a by the sender. A hash function H has the property that H(s)=V, where s is an alphanumeric string of arbitrary string length and V is a binary number of fixed length. The length of V may be, for example, 128 bits, 160 bits (e.g., 16 or 20 bytes) or other suitable length. Hash functions are collision free so that one cannot (in a reasonable amount of time) find an s1 and an s2 such that H(s1)=H(s2). Hash functions are also one-way, so that given a V1, one cannot (in a reasonable amount of time) find an s3 such that H(s3)=V1.

These properties provide several advantages when a hash function H is used in key info field 36a as shown in FIG. 8f. For example, the one-way property of the hash function conceals potentially sensitive information in the key info field during transmission of the message 20 over network 14. Even if the message is intercepted, the interceptor cannot determine the email name of the recipient. This may be beneficial if the recipient does not desire to make the email name available to the general public. Moreover, private key server name information (e.g., as shown in FIGS. 8c and 8d) or other potentially sensitive private key identifier information or key info field information may be hidden from interceptors. Another advantage of using the hash function is that it can tend to make the key info field more compact, because the output of a hash function is typically shorter than the string passed into it. Thus, even if the only string input to the hash function is a recipient ID or a recipient ID plus a public parameter information (as shown in FIG. 8e), it can still be advantageous to use the hash function prior to placing this information into the key info field 36a of the message 20.

The IBE scheme may be used to encrypt message keys for email communications or any other suitable type of messages. When supporting secure communications involving instant messages, it is generally not necessary to continually retransmit the message key. With instant messaging, it is generally acceptable to retain the message key from the first instant message for use in decrypting subsequent instant messages. Accordingly, the first instant message during an instant message session may include a recipient info block (including a key info field and encrypted message key field) and an encrypted message payload. The recipient may use IBE to decrypt the encrypted message key. The decrypted message key may then be retained for decrypting subsequent instant messages during the session. Such subsequent messages may be transmitted from the sender to the recipient with the encrypted message payload but without all of the recipient block information (e.g., without including the encrypted message key).

The foregoing is merely illustrative of the principles of this invention and various modifications can be made by those skilled in the art without departing from the scope and spirit of the invention.

What is claimed is:

1. A method for using identity-based encryption to support encrypted communications in a system in which users at user equipment communicate over a communications network, wherein the system has a plurality of identity-based-encryption private key generators each of which generates private keys for the users and each of which generates respective public parameter information for use in the identity-based encryption of messages to be sent to those users that are associated with that private key generator, wherein senders of messages in the system encrypt each of the messages using an identity-based-encryption algorithm that has as inputs (1) the public parameter information associated with the private key generator associated with an intended message recipient and (2) an identity-based-encryption public key that is based on the identity of that intended recipient, wherein users may have relationships with more than one of the private key generators so that when a given recipient receives a given encrypted message from a given sender, the given recipient may not know in advance which private key generator and which associated public parameter information was used by the given sender to encrypt the given message and may not know in advance which of that given recipient's corresponding private keys to use to decrypt the given encrypted message, the method comprising:

receiving private key identification information at the recipient that was sent from the given sender to the given recipient with the given encrypted message, wherein the private key identification information identifies for the recipient which of the plurality of identity-based-encryption private key generators to contact to obtain an appropriate private key to decrypt the given encrypted message;

with the private key identification information received at the given recipient, identifying which of the plurality of identity-based-encryption private key generators to contact to obtain the appropriate private key to decrypt the given encrypted message; and at the given recipient, retrieving the appropriate private key from the identified private key generator over the communications network.

2. The method defined in claim 1 wherein receiving the private key identification information at the recipient that was sent from the given sender comprises receiving private key identification information that has been placed in a recipient info field in the given message.

3. The method defined in claim 1 wherein receiving the private key identification information at the recipient that was sent from the given sender comprises receiving private key identification information that has been placed in a key info field in the given message.

4. The method defined in claim 3 further comprising using the appropriate private key to decrypt the given message by decrypting an encrypted message key that was sent from the given sender in an encrypted message key field in the encrypted message and then using the message key to decrypt a message payload that was encrypted by the given sender using the message key.

5. The method defined in claim 1 wherein receiving the private key identification information at the recipient that was sent from the given sender comprises receiving private key identification information that has been placed in a key info field in the given message, wherein the key info field comprises a recipient identifier based on an email address of the recipient.

6. The method defined in claim 1 wherein receiving the private key identification information at the recipient that was sent from the given sender comprises receiving private key identification information that has been placed in a key info field in the given message, wherein the key info field comprises a recipient identifier based on an email address of the recipient concatenated with a validity period.

7. The method defined in claim 1 wherein receiving the private key identification information at the recipient that was sent from the given sender comprises receiving private key identification information that has been placed in a key info field in the given message, wherein the key info field comprises a recipient identifier for the given recipient and a private key generator identifier.

8. The method defined in claim 1 wherein receiving the private key identification information at the recipient that was sent from the given sender comprises receiving private key identification information that has been placed in a key info field in the given message, wherein the key info field includes a recipient identifier for the given recipient and a private key generator identifier based on a server name.

9. The method defined in claim 1 wherein receiving the private key identification information at the recipient that was sent from the given sender comprises receiving private key identification information that includes information on the version of the public parameter information used to encrypt the given message by the given sender.

10. The method defined in claim 1 wherein receiving the private key identification information comprises receiving the public parameter information that was used by the given sender in encrypting the given message.

11. The method defined in claim 1 wherein receiving the private key identification information comprises receiving information that has been processed by a hash function.

12. The method defined in claim 1 wherein receiving the private key identification information comprises receiving private key generator identification information that has been processed by a hash function.

13. The method defined in claim 1 wherein the sender provides algorithm identifier information with the message that identifies which identity-based-encryption algorithm is to be used in decrypting the message at the recipient, the method further comprising using the algorithm identifier information when decrypting the message at the recipient.

14. A method for using identity-based encryption to support encrypted communications in a system in which users at user equipment communicate over a communications network, wherein the system has a plurality of private key generators each of which generates private keys for the users, the method comprising:

at a sender, encrypting a message for a recipient that has multiple associated private keys, each generated by a respective one of the private key generators, wherein the sender encrypts the message by using a message key to encrypt a message payload and by using an identity-based-encryption algorithm to encrypt the message key, using as inputs for the identity-based-encryption algorithm public parameter information generated by a given one of the respective private key generators and an identity-based-encryption public key based on the identity of the recipient;

sending the message from the sender to the recipient with the encrypted message key, encrypted message payload, and private key identification information that identifies for the recipient which of the plurality of identity-based-encryption private key generators to contact to obtain an appropriate private key to decrypt the encrypted message;

receiving the private key identification information from the sender at the recipient;

with the private key identification information at the recipient, identifying which of the plurality of identity-based-encryption private key generators to contact to obtain the appropriate private key to decrypt the encrypted message; and at the given recipient, retrieving the appropriate private key from the identified private key generator over the communications network.

15. The method defined in claim 14 further comprising:

decrypting the encrypted message key using the appropriate private key; and using the decrypted message key to decrypt the encrypted message payload.

16. The method defined in claim 14 wherein encrypting the message comprises encrypting the message for a plurality of recipients and wherein sending the message comprises sending the message from the sender to each of the plurality of recipients with private key identification information that identifies for that recipient which of that recipient's private keys is appropriate for decrypting the encrypted message key.

* * * * *